United States Patent [19]

Tomikawa et al.

[11] Patent Number: 5,691,595
[45] Date of Patent: Nov. 25, 1997

[54] VIBRATORY GYROSCOPE

[75] Inventors: Yoshiro Tomikawa, Yonezawa; Kazumasa Ohnishi; Akira Satoh, both of Nagaoka, all of Japan

[73] Assignees: Alps Electric Co., Ltd., Tokyo; Yoshiro Tomikawa, Yamagata, both of Japan

[21] Appl. No.: 531,260

[22] Filed: Sep. 20, 1995

[30] Foreign Application Priority Data

Sep. 20, 1994 [JP] Japan .................. 6-251248

[51] Int. Cl.$^6$ ............................ H01L 41/08
[52] U.S. Cl. ............................ 310/370
[58] Field of Search .................. 310/370, 366, 310/371, 329, 358, 359, 333; 73/505

[56] References Cited

U.S. PATENT DOCUMENTS

| | | | |
|---|---|---|---|
| 3,354,413 | 11/1967 | Ko | 310/321 |
| 4,410,827 | 10/1983 | Kogure | 310/370 |
| 4,538,461 | 9/1985 | Juptner et al. | 73/505 |
| 4,785,215 | 11/1988 | Blech | 310/329 |
| 5,020,370 | 6/1991 | Deval et al. | 310/321 X |
| 5,049,776 | 9/1991 | Ogawa | 310/333 |
| 5,166,571 | 11/1992 | Konno et al. | 310/333 |
| 5,331,242 | 7/1994 | Petri | 310/370 |
| 5,367,217 | 11/1994 | Norling | 310/370 |
| 5,451,828 | 9/1995 | Tomikawa et al. | 310/370 |

FOREIGN PATENT DOCUMENTS

| | | | |
|---|---|---|---|
| 0068020 | 6/1981 | Japan | 310/370 |
| 0194614 | 11/1982 | Japan | 310/370 |
| 0199312 | 12/1982 | Japan | 310/370 |
| 0183520 | 10/1984 | Japan | 310/370 |
| 726653 | 3/1978 | U.S.S.R. | 310/370 |

*Primary Examiner*—Mark O. Budd
*Attorney, Agent, or Firm*—Guy W. Shoup; Patrick T. Bever

[57] ABSTRACT

A vibratory gyroscope including a planar elastic vibrator having vibrator piezoelectric material layers formed on both the front and back sides. The vibrator includes a base portion and three parallel elastic pieces extending from the base portion such that the a center elastic piece is located between two side elastic pieces. Electrode layers are formed over the piezoelectric material layers which cause both the side elastic pieces and the center elastic piece to vibrate in a plane, such that the vibrations of the center elastic piece are 180° out-of-phase with the side elastic pieces. When the thus-vibrated vibrator is rotated, the elastic pieces are vibrated in directions parallel to the plane due to the Coriolis force. These deformations are detected as voltage changes across the piezoelectric material layers, and the voltage changes are used to determinate the angular velocity of the vibrator. The outside edges of the side elastic pieces are offset from an outer edge of the base section to prevent twisting stress, thereby allowing more precise vibration detection.

9 Claims, 9 Drawing Sheets

VIBRATORY GYROSCOPE

BACKGROUND OF THE INVENTION

1. Field of the Invention

The present invention relates to a vibratory gyroscope which determines rotational angular velocity by detecting the Coriolis force generated in a vibrating element, and, in particular, to a vibratory gyroscope which is small in size, capable of being produced in large quantities, and capable of stable angular velocity detection.

2. Description of the Related Art

Gyroscopes have been used for detecting rotating angular velocity, for example, in airplane or ship inertial navigation systems. In recent years, the use of gyroscopes has expanded to include vehicle navigation systems, robots, unmanned running device attitude controls, television and video camera shaking prevention devices, amusement-related devices, etc.

In order for gyroscopes to be used in many of these additional fields of application, it is necessary that the gyroscopes be small in size. For this reason, vibratory gyroscopes are gaining popularity.

Figure 13:
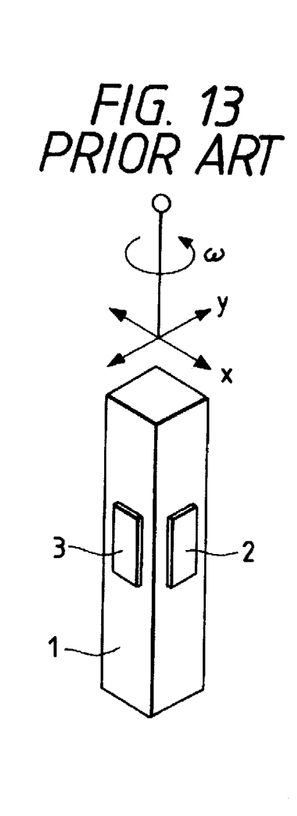
FIG. 13 is a perspective view of a conventional vibratory gyroscope.

FIG. 13 illustrates a basic construction of a conventional vibratory gyroscope. This vibratory gyroscope has a driving piezoelectric element 2 and a detecting piezoelectric element 3 bonded onto a column-shaped vibrator 1 formed from of an elastic alloy, such as elinvar.

When the vibrator 1 is rotated around an axis 0 while being subjected to bending vibration along the x-axis direction by the driving piezoelectric element 2, Coriolis force causes bending vibration of the vibrator 1 along the y-axis direction. This bending vibration caused by the Coriolis force is detected as a voltage change across the piezoelectric element 3. By measuring the voltage change across piezoelectric element 3, it is possible to determine the angular velocity of the vibrator 1. That is, when the mass of the vibrator 1 is defined as m, the instantaneous velocity of the vibrator 1 along the x-axis is defined as v (vector value), and the angular velocity around the O axis is defined as ω (vector value), the Coriolis force F (vector value) is determined by the following formula:

$$F = 2m(v \times \omega)$$

where "v x ω" is a vector cross product. The above formula shows that the Coriolis force F is proportional to the angular velocity ω. Therefore, by determining the mass m and velocity v using known methods, the angular velocity ω can be determined from the detected Coriolis force (voltage signal) provided by detecting piezoelectric element 3.

A drawback of the conventional vibratory gyroscope shown in FIG. 13 is that it is very expensive to produce. First, the elastic alloy, which is very expensive, must be processed into a highly precise column form. This process wastes material and is very time consuming. Further, in this type of vibratory gyroscope, the resonance frequency of the vibrator 1 must be tuned in response to the bending vibration applied by piezoelectric element 2 by cutting a portion of the column-shaped vibrator 1. This adjusting produces further material waste and requires additional production time.

Figure 14:
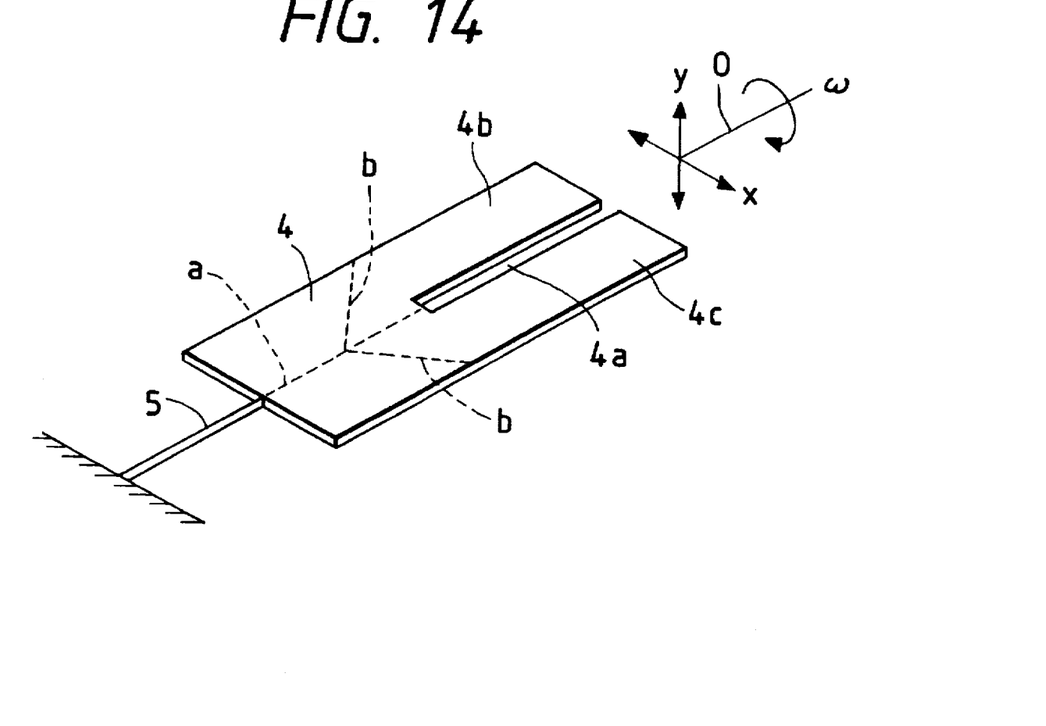
FIG. 14 is a perspective of a conventional tuning fork type vibrator.
Figure 15A:
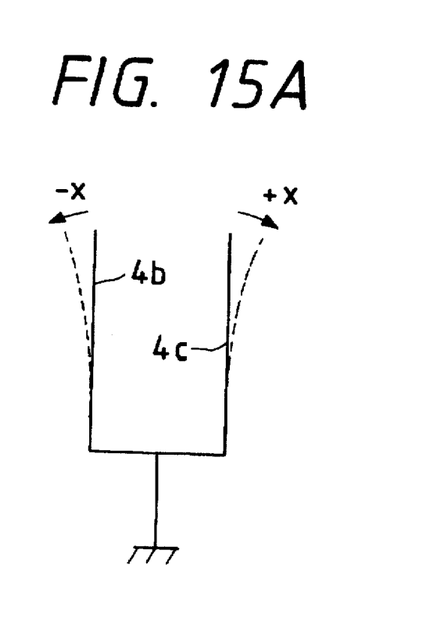
Figure 15B:
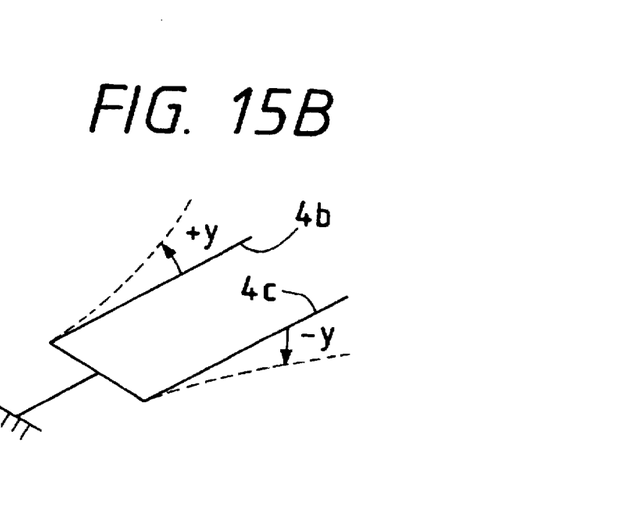
FIG. 15B is illustrative of deformation of the vibrator caused by the Coriolis force.

FIG. 14 shows a tuning fork type vibratory gyroscope which overcomes some of the problems associated with the above-described conventional vibratory gyroscope. In the tuning fork type vibratory gyroscope, a slit 4a is formed in the central portion of a vibrator plate 4, the slit 4a separating the vibrator plate 4 into two elastic pieces 4b and 4c. As shown in FIG. 15A, these elastic pieces 4b and 4c are vibrated separately at their respective natural resonance frequencies along the +x and −x directions by driving piezoelectric elements (not shown). The driving frequencies are 180° out-of-phase such that, at a certain point in time, the elastic pieces 4b and 4c are bent in opposite directions along the x-axis direction. When the vibrator 4 is rotated around the axis O with such a vibration applied thereto, deformation occurs in the −y and +y directions, respectively, due to the Coriolis force, as shown in FIG. 15B. This deformation is detected as a voltage change across detecting piezoelectric elements (not shown), and the voltage signal is used to determine the angular velocity ω of the vibrator 4 using the method described above.

The plate-shaped conventional tuning fork type vibrator 4, shown in FIGS. 14 and 15, has the following problems.

First, an asymmetrical vibration of the elastic pieces 4b and 4c often occurs which produces twisting stress in the entire vibrator, thereby preventing reliable angular velocity detection. This asymmetrical vibration can be reduced by adjusting the resonance frequencies of the elastic pieces 4b and 4c. However, adjustment of the resonance frequencies of the elastic pieces 4b and 4c requires separate trimming operations of the elastic pieces 4b and 4c, so that resonance frequency adjustment is difficult and expensive to perform. Further, frequency adjustment process may result in an asymmetrically-shaped vibrator 4, thereby reducing angular velocity detection precision.

Second, when deformation vibration of each of elastic pieces 4b and 4c occurs along the y-axis direction due to the Coriolis force, the nodal lines of these vibrations are located in areas (a) and (b) of the vibrator, as shown in FIG. 14. The location of these nodal lines make it necessary to support the vibrator 4 in a cantilever manner using, for example, a supporting rod 5, as shown in FIG. 14. However, in a construction in which the vibrator is supported in a cantilever manner using the supporting rod 5, the mechanical supporting strength of the vibrator becomes unstable, so that the vibrator 4 is easily affected by external vibrations, thereby causing unreliable angular velocity detection.

SUMMARY OF THE INVENTION

An object of the present invention is to overcome the above-described problems of the prior art by providing a vibratory gyroscope in which frequency adjustment is greatly simplified, thereby lowering manufacturing costs, and in which a stable support structure is used, thereby allowing stable angular velocity detection.

According to the present invention, there is provided a vibratory gyroscope including a vibrator having a base section and three elastic pieces (arms) separated by two slits extending from the base section. The vibrator is formed as a plate-shaped elastic member defining a plane, and includes a first driving/detecting structure formed thereon which either causes vibrational deformation of the elastic pieces due to the piezoelectric effect in the plane of the vibrator, or detects voltage changes indicating vibrational deformation of the elastic pieces in the plane. In addition, the vibrator includes a second driving/detecting structure which either causes vibrational deformation of the elastic pieces due to the piezoelectric effect in a direction perpendicular to the plane of the vibrator, or detects vibrational deformations of said elastic pieces perpendicular to the plane. One of the first and second driving/detecting structures determines the angular velocity of the vibrator from voltage changes produced by the deformation vibration of the elastic pieces, the deformation vibration being caused by the Coriolis force produced when the vibrator is rotated while the elastic pieces are subjected to deformation vibration by the other of the first and second driving/detecting structures.

According to the present invention, the outside edges of the base section of the vibrator are offset from outer edges of the side elastic pieces such that a width of the base section is greater than a distance separating the outer edges of the elastic pieces. Specifically, the outer edge of a left-most elastic piece defines a first line and the outer edge of a right-most elastic piece defines a second line which is parallel to the first line, and the first and second lines are located between the outside edges of the base section. Therefore, the total width of the three elastic pieces and the two slits added together is less than the width of the base section of the vibrator.

In accordance with a first aspect of the present invention, the elastic pieces have a common width, and the offset (level difference) between the outside edge of elastic pieces and the outer edges of the base section, measured perpendicular to the edges of the elastic pieces, is less than 0.8 times the width of each elastic piece.

In accordance with another aspect of the present invention, the vibrator of the vibratory gyroscope is arranged such that either the first driving/detecting structure includes a pair of electrodes which produce deformation forces in the elastic pieces by generating coupled forces which cause bending around an axis extending perpendicular to the plane of the vibrator, or the second driving/detecting structure includes a pair of electrodes which produce deformation forces in the elastic pieces by generating coupled forces which cause bending around an axis extending in the plane of the vibrator.

In accordance with another aspect of the present invention, the second driving/detecting structure separates electrodes for detecting compressed and elongated portions on the surface of the elastic pieces when the elastic pieces vibrate perpendicular to the plane of the vibrator in a secondary or higher degree resonance mode.

According to another aspect of the present invention, the second driving/detecting structure includes piezoelectric material layers having different polarization directions for detecting the compressed portion and elongated portion on the surface of each elastic piece when each elastic piece vibrates in a secondary or higher degree resonance mode, and electrode layers are formed on the piezoelectric material layers. Alternatively, the second driving/detecting structure includes piezoelectric material layers having the same polarization directions for detecting the compressed portion and elongated portion on the surface of each elastic piece when each elastic piece is vibrating perpendicular to the plane in a secondary or higher degree resonance mode, and separate electrode layers formed on said compressed portion and elongated portion of each piezoelectric material layer.

According to another aspect of the present invention, a length of the detection region of each elastic piece adjacent the base section is less than 0.5 times the overall length of the elastic pieces when the elastic pieces vibrate in a direction perpendicular to the plane of the vibrator in the secondary resonance mode.

According to another aspect of the present invention, the vibrator includes piezoelectric material layers laminated on both the front and back sides of the plate-shaped elastic pieces and electrode layers formed on the piezoelectric material layers, wherein the first and second driving/ detecting structures include both electrode layers and piezoelectric material layers.

In accordance with another aspect of the present invention, the three elastic pieces are driven in a deformation vibration mode in which the side elastic pieces are driven in a common phase, while the center elastic piece is driven in an opposite phase (that is, the center elastic piece vibrates 180° out-of-phase with the side elastic pieces).

The vibratory gyroscope of the present invention may include all the aspects set forth above, or only one or more of the aspects.

As will be understood from the following description, according to the present invention, the vibrator is plate-shaped, so that it can be manufactured in large quantities at a low cost. In addition, since a supporting construction using rigid bodies may be used, the vibratory gyroscope is not sensitive to external vibrations. Further, the resonance frequency can be adjusted simply by trimming the center elastic piece, thereby allowing easy resonance frequency adjustment.

In addition, by offsetting the outside edges of the side elastic pieces and the outer edges of the base section of the vibrator, twisting stress is prevented from acting on the base section, thereby allowing the vibrator to resonate stably.

Further, by constructing the electrodes such that they drive the elastic pieces using coupled forces both in an H mode (within the plane of the vibrator), and a V mode (perpendicular to the plane of the vibrator), the vibratory gyroscope according to the present invention allows highly precise detection of the deformation of the vibrator caused by the Coriolis force.

By providing separate detecting structures for detecting compression and elongation of the elastic pieces in a secondary or higher degree resonance mode, the detected compressed portion and elongated portion may be added together to provide a more accurate detection signal.

Forming the vibrator into a laminated structure of piezoelectric material layers on the front and back sides of the elastic member allows a larger strain force to act on the elastic pieces due to the piezoelectric effect, and detection of the strain in the elastic pieces can be detected with high precision. Forming the vibrator by punching out the laminated structure makes it unnecessary to position and bond the individual piezoelectric material layers, thereby simplifying the manufacturing process while producing gyroscopes with higher precision than those of the prior art.

BRIEF DESCRIPTION OF THE DRAWINGS

FIG. 3A is a plan view of a preferred embodiment of the vibrator, while

FIG. 8A is an enlarged end view of electrode layers of each elastic piece of a vibrator, while

FIG. 15A is an illustration of a vibrating state of the vibrator of FIG. 14 when driven by the driving element, while

DESCRIPTION OF THE PREFERRED EMBODIMENTS

A description will now be given of the present invention with reference to the drawings. The invention is described using reference directions (x-, y- and z-axis). These reference directions are provided for purposes of explanation, and are not intended to limit the appended claims.

Figure 1:
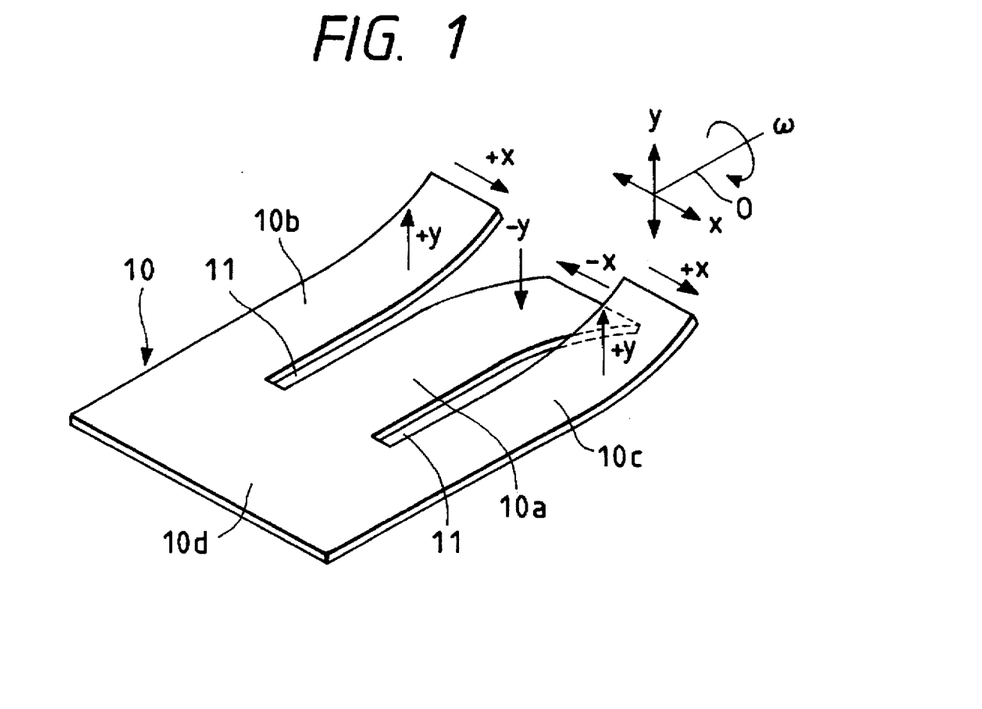
FIG. 1 is a perspective view of a basic form and operation state of a vibrator in accordance with the present invention.
Figure 2:
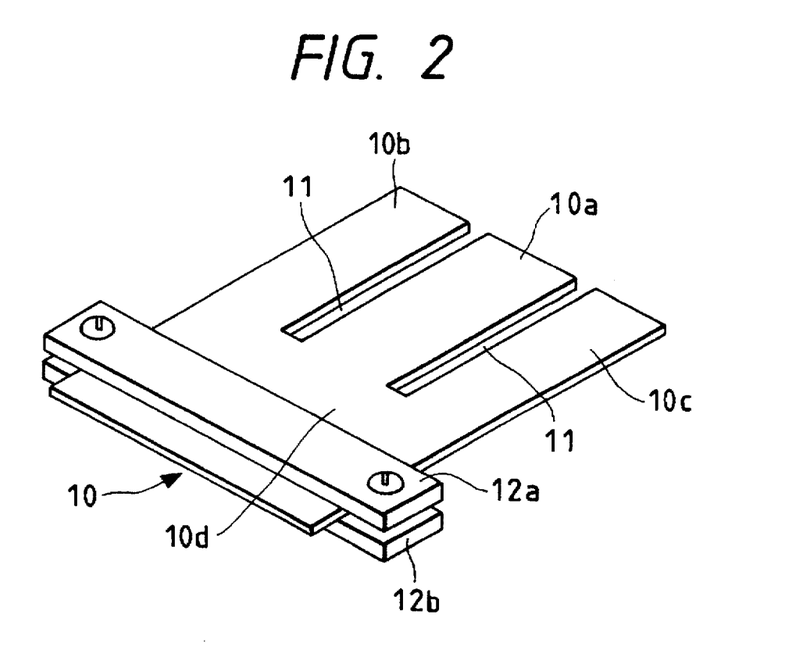
FIG. 2 is a perspective view of a supporting structure for the vibrator.

FIG. 1 is a perspective view showing a basic construction and operation of the vibrator employed in the vibratory gyroscope of the present invention, while FIG. 2 is a perspective view of a supporting structure for the vibrator of FIG. 1.

Referring to FIG. 1, the basic vibratory gyroscope of the present invention includes a plate-shaped vibrator 10 which is primarily composed of elastic alloy, such as elinvar. For purposes of explanation, the plate-shaped vibrator 10 is oriented in an x-z plane. In accordance with a preferred embodiment of the present invention, piezoelectric material layers are laminated entirely on the front and back sides of the elastic alloy plate material, with electrode layers formed on the piezoelectric material layers. The piezoelectric material layers and electrode layers are described below.

Elinvar is a material whose Young's modulus changes very little with changes in temperature at or near room temperature. Other elastic alloys which may be used to produce the vibrator 10 include alloys of Fe (iron), Ni (nickel), Cr (chromium), and Ti (titanium), and such alloys with Co (cobalt) added thereto.

In the following description, vibrations of the elastic pieces (arms) of the plate-shaped vibrator 10 in a y-z plane (that is, perpendicular to the plane of the vibrator 10) are designated as vibrations in a "y-axis direction", while vibrations of the elastic pieces in the x-z plane are designated as vibrations in an "x-axis direction". As shown in FIG. 1, the rotational angular velocity of the vibrator around the z-axis is represented by ω.

As illustrated in FIG. 1, the vibrator 10 has two slits 11 formed therein, both of which are the same length in the z-axis direction as measured from a front end of the plate material. The slits 11 are formed such that the vibrator 10 is cut out completely along the plate thickness dimension (y-axis direction), whereby a total of three separate elastic pieces (arms) are formed which extend in the z-axis direction and have widths measured along the x-axis direction. These elastic pieces include a central elastic piece 10a, and left and right side elastic pieces 10b and 10c which are located on both sides of the central elastic piece 10a. The three elastic pieces 10a, 10b and 10c extend from a base portion 10d. The vibrator 10 is symmetrical about the z-axis which bisects the center elastic piece 10a.

As discussed below, first and second driving/detecting structures, composed of piezoelectric material layers, are formed entirely on both sides of the elastic alloy member. In addition, electrode layers are formed on the elastic alloy member over the piezoelectric material layers. The arrangement of the electrode layers will also be described in detail below. The first driving/detecting structure receives driving signals from a controller (not shown) which causes contraction and expansion of the piezoelectric material, thereby bending each elastic piece 10a, 10b, and 10c along the plate surface dimension (x-axis direction) due to the piezoelectric effect. Conversely, the first driving/detecting structure can detect deformation of each elastic piece along the plate surface dimension (x-axis direction) as voltage changes due to the piezoelectric effect. Similarly, the second driving/detecting structure receives driving signals from the controller (not shown) which causes contraction and expansion of the second driving/detecting structure, thereby bending each elastic piece 10a, 10b, and 10c along the plate thickness dimension (y-axis direction) due to the piezoelectric effect. The second driving/detecting structure can also detect the deformation of the elastic pieces by the piezoelectric effect as a voltage change, when the elastic pieces are deformed along the y-axis direction.

The vibration modes of the elastic pieces 10a, 10b and 10c of the vibrator 10 include a first vibration mode in the x-axis direction (along the plate surface, hereinafter referred to as "H mode"), and a second vibration mode in the along the y-axis direction (perpendicular to the plate surface, hereinafter referred to as "V mode").

In a first method for detecting the angular velocity (ω) according to the present invention, the first driving/detecting structure drives the side elastic pieces 10b and 10c on both sides of the central elastic piece 10a in a first phase such that, at a certain point in time, the side elastic pieces 10b and 10c are bent in the +x-axis direction, while center elastic piece 10a is driven in a second phase, which differs by 180° from the first phase, such that, at the certain point in time, the center elastic piece is bent in the −x-axis direction. When the vibrating vibrator 10 is rotated at an angular velocity ω, a Coriolis force is developed which causes the elastic pieces 10b and 10c to be subjected to vibrational deformation in the −y-axis direction (V mode vibration) at a first phase, and causes the center elastic piece 10a to be subjected to vibrational deformation in the −y-axis direction at a second phase, the first phase being 180° out of phase from the second phase. Deformation of each elastic piece caused by the Coriolis force along the y-axis direction are detected as voltage changes in the second driving/detecting structure. Since the Coriolis force is proportional to the angular velocity ω based on the aforementioned formula F=2m (v x ω), detection of the amount of deformation caused by vibration of each elastic piece along the y-axis direction, for example, as a voltage change, allows the angular velocity ω to be determined. In a second method for detecting the angular velocity ω, the first driving/detecting structure is used to vibrate only the side elastic pieces 10b and 10c in the same phase such that, at a certain point in time, both elastic pieces 10b and 10c are bent in the +x-axis direction. Vibration of the elastic pieces 10b and 10c in the +x-axis direction produces a counterforce which causes the center piece 10a to vibrate in an opposite phase to the elastic pieces 10b and 10c; that is, the center piece 10a bents in the −x-axis direction at the certain point in time. Rotation of the vibrating vibrator 10 about the z-axis with an angular velocity ω develops Coriolis force which causes deformation of the elastic pieces 10a, 10b and 10c such that the elastic pieces 10b and 10c vibrate in a first phase, and the center elastic piece 10a vibrates in an opposite (180°) phase. Deformation of each elastic piece along the y-axis direction is detected by the second/detecting structure so as to allow determination of the angular velocity ω.

In a third method for detecting the angular velocity, the second driving/detecting structure is used to drive each elastic piece along the y-axis direction (V mode). In this case, the side elastic pieces 10b and 10c are vibrated at a predetermined frequency in a first phase, and the center elastic piece 10a is vibrated at a second phase such that, as shown in FIG. 1, the elastic pieces 10b and 10c are deformed at a certain point in the +y-axis direction while the center elastic piece 10a is deformed in the −y-axis direction. When the vibrating vibrator 10 is rotated, Coriolis force is produced which causes the elastic pieces 10a, 10b, and 10c to be deformed along the plate surface dimension (x-axis direction) and resonate in the H mode. The deformation caused by vibration of the elastic pieces with the phases illustrated in FIG. 1 is detected as voltage by the first driving/detecting means so as to allow determination of the angular velocity ω.

It is also possible to drive only the elastic pieces 10b and 10c on both sides of the center elastic piece 10a along the y-axis direction. In this case, a counterforce causes the center elastic piece 10a to vibrate 180° out-of-phase with the elastic pieces 10b and 10c such that, at a certain point in time, the elastic piece 10a is bent in a direction opposite to the direction in which the elastic pieces 10b and 10c are bent. It is also possible to drive only the center elastic piece 10a along the y-axis direction. In this case, a counterforce causes the elastic pieces 10b and 10c on both sides of the center elastic piece to be vibrated in a phase opposite to the center elastic piece 10a. In both cases, when the vibrating vibrator 10 is rotated, the Coriolis force produced thereby deforms the elastic pieces 10a, 10b, and 10c along the x-axis direction as shown in FIG. 1. This deformation vibration is detected by the first driving/detecting element.

As disclosed in co-owned U.S. patent application Ser. No. 08/278776, when the left and right elastic pieces 10b and 10c, and the center elastic piece 10a vibrate in opposite phases along the y-axis direction, only the length of the center elastic piece 10a needs to be adjusted to complete a resonance frequency adjustment operation for the vibrator 10. In adjusting the frequency by only changing the length of the center elastic piece 10a, the vibrator 10 remains symmetrical in form, so that performing the adjustment will not result in a twisting vibration caused by an asymmetrical vibrator. In the aforementioned adjustment of the resonance vibration frequency along the y-axis direction, changing the length of the center elastic piece does not affect the resonance vibration frequency of any of the elastic pieces 10a, 10b and 10c along the x-axis direction. Therefore, the secondary resonance vibration of each elastic piece 10a, 10b and 10c along the y-axis direction can be easily adjusted to approximately the primary resonance vibration frequency along the x-axis direction.

In other words, by vibrating each elastic piece along the x-axis direction in the primary resonance mode while causing each elastic piece to resonate along the y-axis direction in the secondary resonance mode, the frequencies of the first and second resonance modes in each of the x-axis and y-axis directions may be made to coincide by adjusting the length of the elastic piece 10a. The ability to adjust the resonance frequencies makes the present invention preferable as a vibratory gyroscope.

When vibration takes place along the y-axis direction, the center elastic piece 10a vibrates in an opposite phase from the side elastic pieces 10b and 10c so that the vibration amplitude at the end of the base section 10d (where slits 11 are not formed) is extremely small. In addition, twisting vibration of the base section 10d occurs very infrequently. Therefore, as shown in FIG. 2, it is possible to employ a supporting structure in which the end portion of the base section 10d of the vibrator 10 is clamped by rigid bodies 12a and 12b. With such a supporting construction employing rigid bodies, the vibration modes of the vibrator are not easily affected by external vibrations.

Figure 3A:
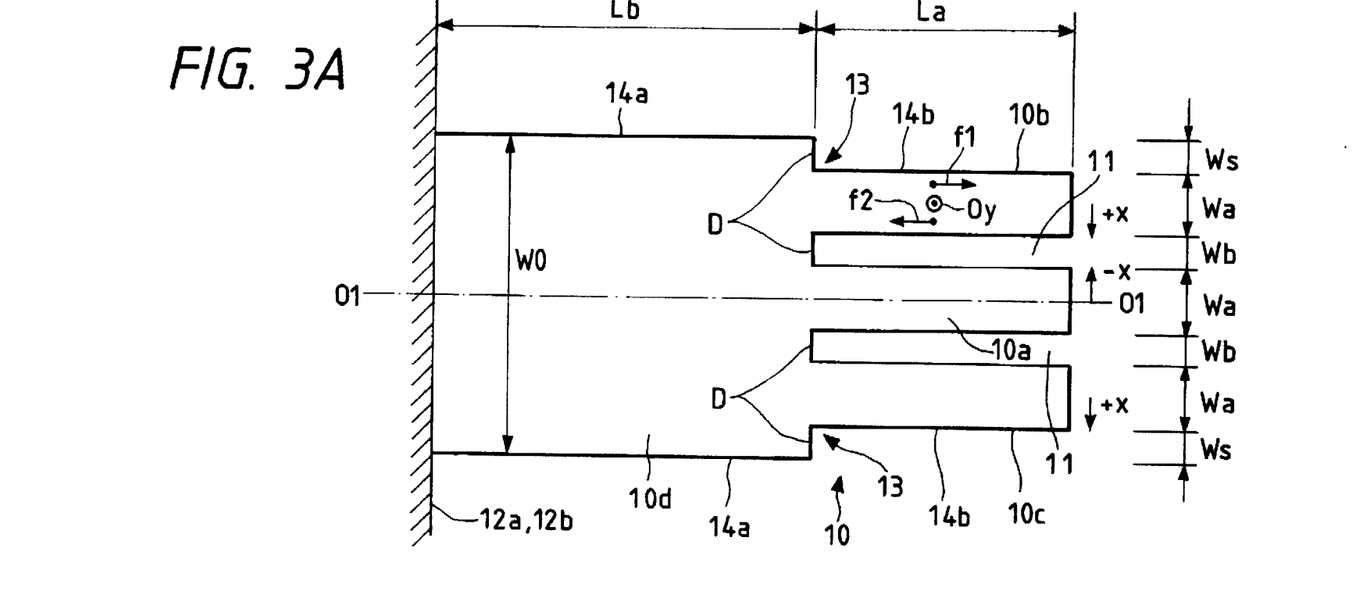
Figure 3B:
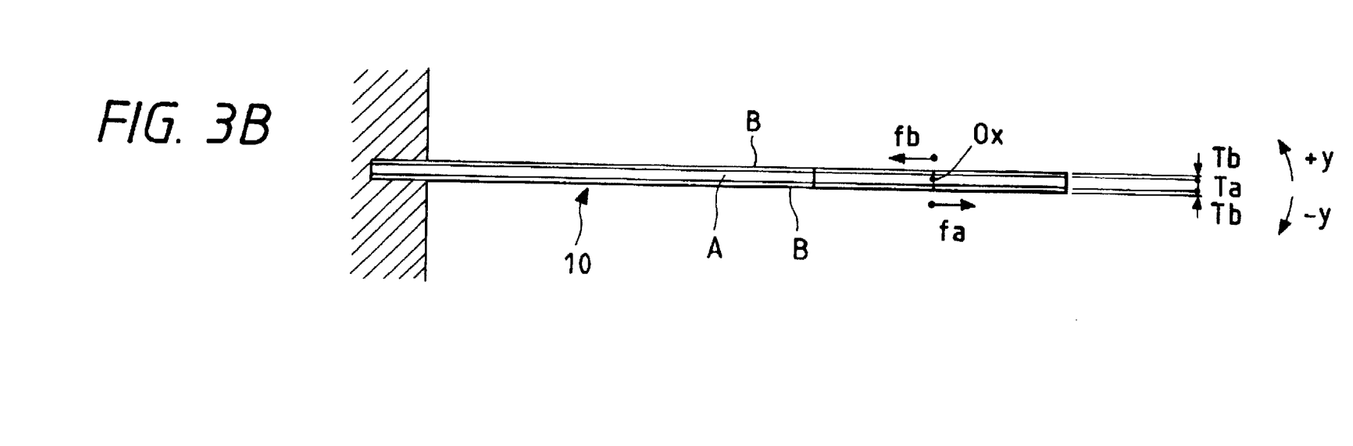
FIG. 3B is a side view thereof.

According to the present invention, the vibratory gyroscope includes a vibrator 10 as a principle portion, the vibrator having the form and capable of vibrating in the V vibration mode and the H vibration mode illustrated in FIG. 1. However, the vibrator 10 of FIGS. 3A and 3B has a form which allows it to vibrate more stably and to detect the angular velocity (ω) with higher precision. FIG. 3A is a plan view of the vibrator 10, while FIG. 3B is a side view thereof.

The vibrator 10 is a laminated member having a core layer composed of elastic member A (plate thickness Ta) made of elastic alloy in plate form, laminated with piezoelectric material layers B (plate thickness Tb) entirely on the front and back sides of the elastic member A.

The vibrator 10 of FIG. 3A is symmetrical on the left and right sides (top and bottom sides in the figure) of the center line 01—01. The three elastic pieces 10a, 10b, and 10c are all of the same width (Wa) measured in the x-axis direction. Both slits 11, which separate the elastic pieces, have widths Wb measured in the x-axis direction. The three elastic pieces 10a, 10b, and 10c are all of the same length (La), with the length between the base section 10d and the starting boundary of the elastic piece (or the length of the base section 10d) measuring Lb, both La and Lb being measured in the z-axis direction.

As illustrated in FIG. 3A, level difference (offset) portions 13 are formed between the outer left and right side edges 14b of the elastic pieces 10b and 10c and the outer edges 14a of the base section 10d. The level difference portions 13, which are right angled, are formed into the shape of a recess. The right-angled level difference portions 13 and the bottom portions of the slits 11 are located on common line D extending in the x-axis direction. The depth of cut of the level difference portions 13 along the x-axis direction are both Ws. With the dimensions defined thusly, the total sum of the widths of the three elastic pieces 10a, 10b, and 10c (Wa), and the widths of the two slits 11 (Wb), which can be expressed by the equation 3Wa+2Wb, is smaller than the width W0 of the base section 10d by 2Ws.

Since there are differences in level between the outside edges 14b of the elastic pieces 10b and 10c of the vibrator 10 and the outer edges 14a of the base section 10d, when the elastic pieces 10a, 10b, and 10c vibrate along the x-axis and y-axis directions, the stress produced in the outside edges 14b is absorbed by the difference-in-level portions 13, thereby making it difficult for the stress to reach the base section end where the base section 10d is supported by the rigid bodies. As a result, undesirable vibration of the base section 10d along the twisting dimension thereof due to the vibration of the elastic pieces 10a 10b, and 10c occurs less frequently, thus resulting in stable vibration of the elastic pieces and detection of angular velocity with higher precision.

Figure 4:
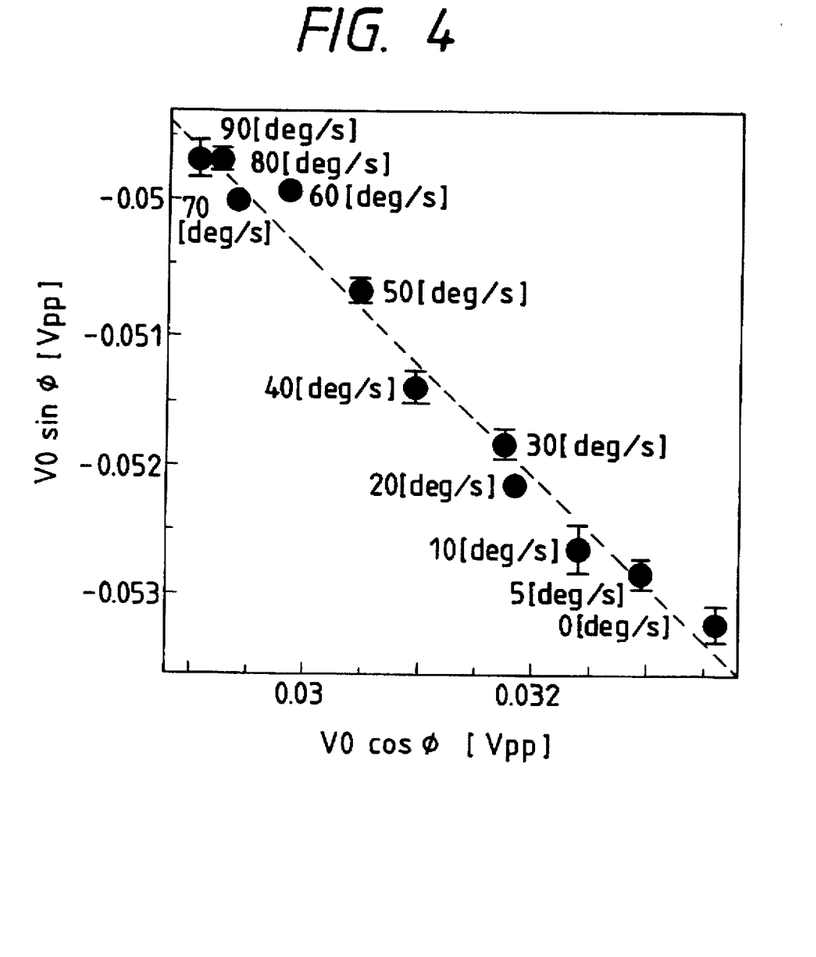
FIG. 4 is a diagram showing the precision of detection of the preferred vibratory gyroscope according to the present invention.

FIG. 4 shows actual measurements of the angular velocity carried out using the vibrator 10 with level difference portions 13. Although the vibrator shown in FIG. 12 was used in the experiment, the dimensions of the various portions, etc., are shown in FIG. 3.

In the vibrator 10 used in the experiment, Wa=7 mm, Wb=0.6 mm, Ws=2.0 mm, La=20 mm, Lb=30 mm, Ta=0.6 mm, and Tb=0.25 mm. In the vibrator 10, the first driving/detecting structure caused the elastic pieces 10b and 10c to vibrate with an amplitude in the +x-axis direction at a certain point in time while the center elastic piece 10a was caused to vibrate with an amplitude in the −x-axis direction, during which the vibrator 10 is rotated at an angular velocity of ω. The Coriolis force produced by vibrations along the y-axis direction, such as that illustrated in FIG. 1, caused deformation of the elastic pieces, and this deformation was detected by the second driving/detecting structure as a voltage change.

Figure 5:
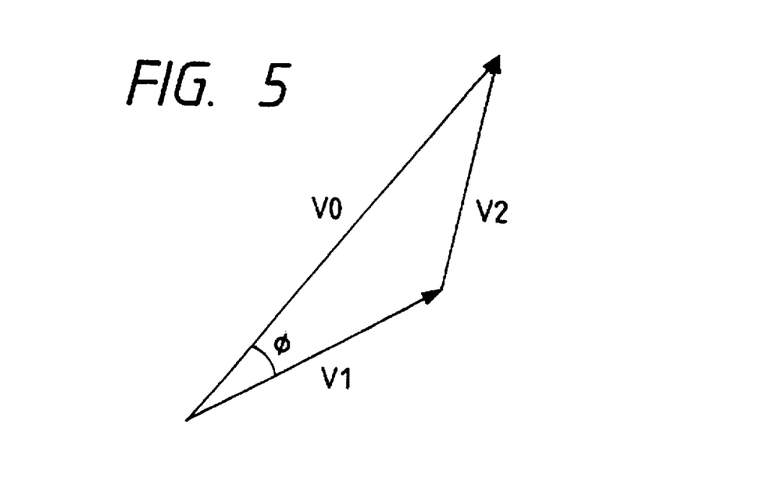
FIG. 5 is a vector diagram showing a detected vibratory gyroscope loss voltage.

In FIG. 5, vector V0 denotes the detected voltages based on the deformations of the elastic pieces along the y-axis direction produced by the Coriolis force in the vibratory gyroscope having the vibrator 10. Leakage output voltage V1 occurs when the vibrator 10 does not rotate, while voltage V2, which is proportional to angular velocity ω, is produced when the vibrator 10 rotates. Phase difference φ is the phase difference between voltages V0 and V1. FIG. 4 is provided with the horizontal axis showing V0·cos φ and the vertical axis showing V0·sin φ, and clearly shows that stable detection of the angular velocity ω by the vibrator 10 having the form shown in FIG. 3 has been achieved and that a stable V2 has been obtained. The vertical line through each dot in the diagram of FIG. 4 indicates variations in the measurement values, while each dot indicates the average value of the variations. FIG. 4 shows that the measurement values do not vary significantly from the ideal. This shows that detection of angular velocity with very high precision can be achieved by the vibrator 10 with the level difference portions 13.

Figure 6:
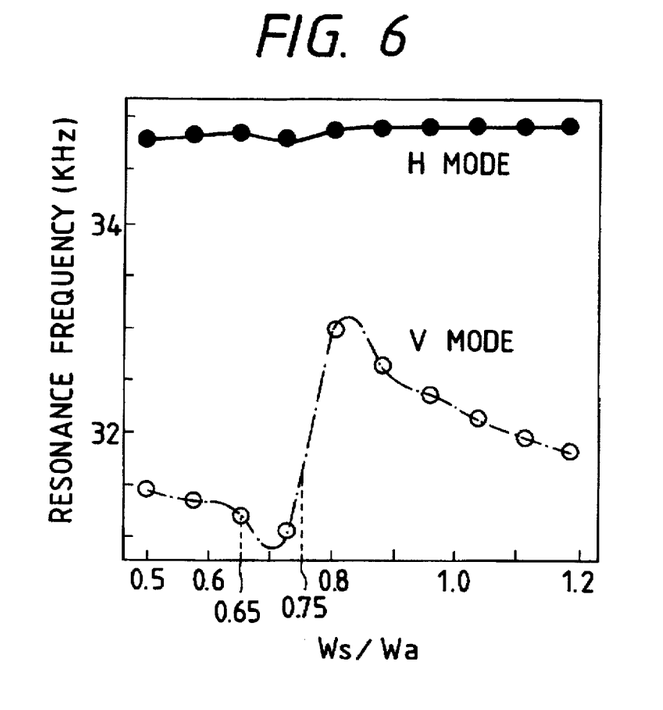
FIG. 6 is a diagram showing a relationship between vibrator shape and resonance frequency.

FIG. 6 shows the extent to which changes in depth Ws of the level difference portions 13 affects resonance frequency.

In the vibrator employed in this experiment, Wa=2.6 mm, Wb=0.2 mm, La=6 mm, Lb=10 mm, Ta=0.2 mm, and Tb=0.1 mm. A plurality of vibrators 10 having level difference portions 13 of different depths Ws (W0 changed) were fabricated. The resonance frequencies (kHz) along the x-axis direction (H vibration mode) and along the y-axis direction (V vibration mode), both of which are shown in FIG. 1, were determined for each vibrator type.

In FIG. 6, the horizontal axis shows Ws/Wa, while the vertical axis shows resonance frequency (kHz). Referring to the figure, the resonance frequency in the H vibration mode (denoted by a black dot) is not significantly affected by the Ws/Wa value, which reveals that resonance frequency is stable. On the other hand, the resonance frequency in the V vibration mode is significantly affected by Ws/Wa value. However, when Ws/Wa is less than 0.8 mm, even when Ws/Wa changes, the resonance frequency in the V vibration mode changes only slightly.

More specifically, as shown in FIG. 6, although the level difference portions 13 prevent twisting vibration of the vibrator 10 from occurring so as to increase the precision of the angular velocity detection, when, for example, Ws/Wa is greater than 0.8, variations which occur in the Ws/Wa value due to manufacture tolerances, etc., cause variations to occur in the resonance frequency in the V vibration mode. FIG. 6 shows that Ws/Wa is preferably less than 0.8, or less than 0.8 and more than 0.5, and more preferably less than 0.75, or less than 0.75 and more than 0.5, and even more preferably less than 0.65, or less than 0.65 and more than 0.5. When Ws/Wa falls within any of the aforementioned ranges, variations in Ws/Wa due to manufacture tolerances causes almost no changes in the resonance frequency. With the level difference portions 13 provided and Ws/Wa set within any of the above range values, variations in the number of resonance vibrations do not occur even when the vibrators are manufactured with a low precision and rough processing is performed, so that a stable angular velocity detection, as illustrated in FIG. 4, can be reliably achieved. It is to be noted that Ws/Wa for the vibrator 10 used in the experiment of FIG. 4 is 0.5.

Figure 7:
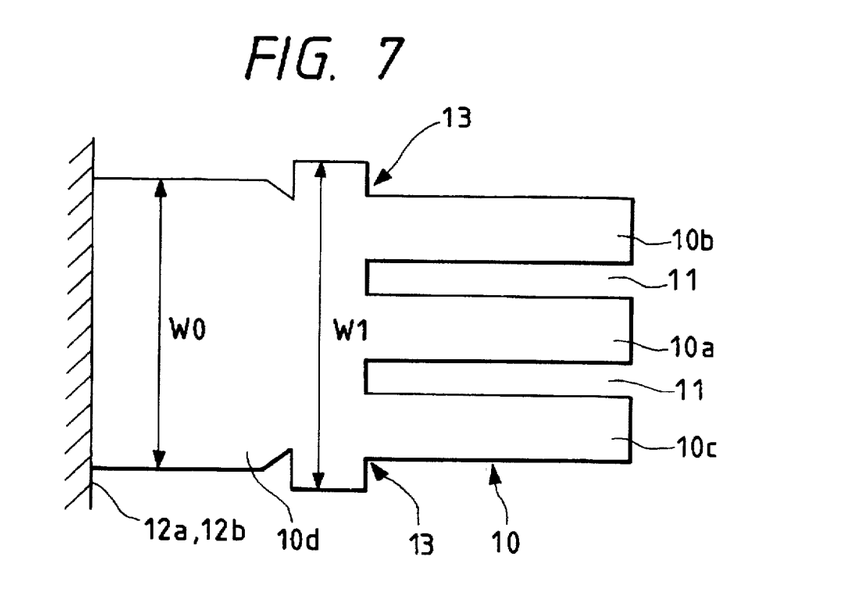
FIG. 7 is a plan view of a vibrator according to a second embodiment of the present invention.

The aforementioned advantages are achieved by forming level difference portions 13 between the left and right side edges 14b of the elastic pieces 10b and 10c and the outer edges 14a of the base section 10d, such that the edges 14b and 14a are not co-linear. The level difference portions 13 do not necessarily have to be right-angled. The side ends 14b and 14a may be curved. As shown in FIG. 7, the width W1 between the boundary of the base section 10d and the starting points of the elastic pieces may be made slightly larger than the width W0 of another part of the base section 10d so as to form level difference portions 13 between this boundary and the elastic pieces 10b and 10c. The entire vibrator 10 of FIGS. 3 and 7 may be composed of piezoelectric material.

Figure 8A:
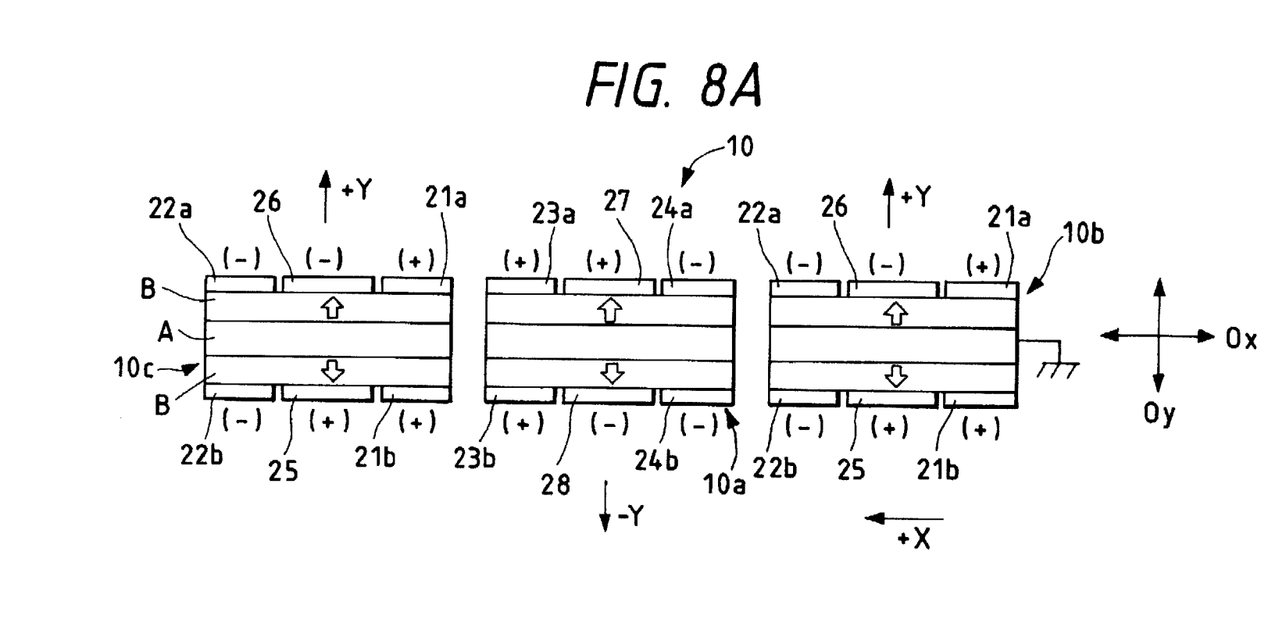
Figure 8B:
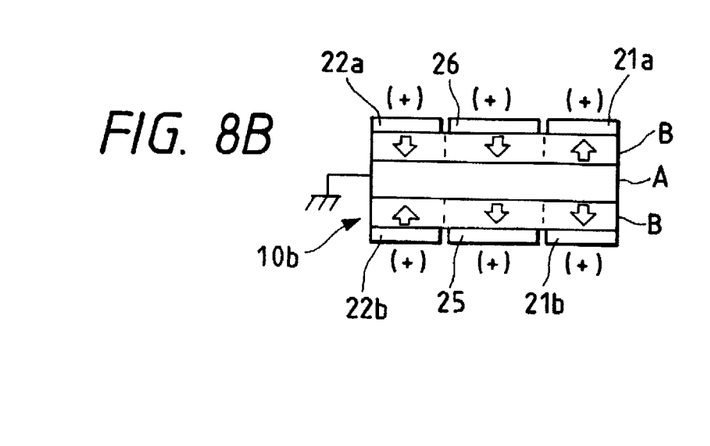
FIG. 8B is an enlarged end view of electrode layers of another elastic piece.

FIG. 8 illustrates electrode layers used for driving the vibrator 10. FIG. 8A is an enlarged view of FIG. 3A of the front ends of the elastic pieces 10a, 10b and 10c of the vibrator 10. FIG. 8B is another enlarged view showing only the ends of the elastic piece 10b.

The vibrator 10 of FIGS. 8A and 8B has a laminated structure of piezoelectric material layers B on both the front and back sides of the elastic member A.

The vibrator 10 of FIGS. 8A and 8B is assumed to vibrate resonantly in the same vibration mode as illustrated in FIG. 1. Each elastic piece 10a, 10b and 10c is driven such that they vibrate along the plate surface dimension (x-axis direction) in the primary resonance H mode, and when the vibrator 10 is rotated around the z-axis, the elastic pieces 10a, 10b, and 10c are vibrated along the plate thickness dimension (y-axis direction) by the Coriolis force in the secondary resonance V mode.

As shown in FIG. 1, the side elastic pieces 10b and 10c are driven with the same driving signal and have similar first driving elements such that the side elastic pieces vibrate in a common phase and amplitude.

In FIG. 8A, the polarization directions of the piezoelectric material layers B laminated on both the front and back sides of the elastic member A are within the same area range of each elastic piece. In FIG. 8A, the polarization directions of the piezoelectric material layers B are in the opposite direction along the thickness dimension, and as shown by the white arrows, the polarization direction is toward the surfaces of the piezoelectric material layer.

It can be seen that the elastic piece 10b has laminated on the piezoelectric material layer B at the top side of the figure a pair of electrode layers 21a and 22a. Alternating (ac) voltage is applied to each electrode layer 21a and 22a, in which at a certain point in time positive (+) voltage is applied to the electrode layer 21a, and negative (−) voltage is applied to the electrode layer 22a. When such voltages are applied, as shown in FIG. 3A, an elongation force f1 (away from the base section 10d) acts on the piezoelectric material layer B at the portion the electrode layer 21a is formed, while a compression force f2 (toward the base section 10d) acts at the portion the electrode layer 22a is formed. By the pair of electrode layers 21a and 22a formed within the x plane, the forces f1 and f2, acting in opposite directions, are coupled forces which act within the x plane. These coupled forces f1 and f2 cause rotation (produce a moment) around a center axis which is represented as an imaginary line Oy extending along the plate thickness dimension (y-axis direction) of the elastic piece. When negative ac voltage (−) is applied to the electrode layer 21a and a positive (+) ac voltage is applied to the electrode layer 22a, coupled forces f1 and f2 act in opposite directions.

Such coupled forces, causing rotation around the center axis Oy, which act on the piezoelectric material layer B having formed thereon the pair of electrode layers 21a and 22a, permits efficient vibration of the elastic piece 10b in the ±x-axis directions.

In the embodiment of FIG. 8A, a pair of electrode layers 21b and 22b are also formed on the piezoelectric material layer B at the bottom side of elastic elements 10b and 10c. The driving signals applied to each electrode layer 21b and 22b are the same as those applied to the aforementioned electrode layers 21a and 22a, respectively. Therefore, the coupled forces which cause rotation around the center axis indicated by the imaginary line Oy acts on the piezoelectric material layer B at the bottom side of FIG. 8 when the same driving signals as those applied at the top piezoelectric material layer B are applied at the bottom piezoelectric material layer B. Therefore, the elastic piece 10b is acted upon by coupled forces f1 and f2, which act in opposite directions, applied through both piezoelectric material layers B formed on the front and back sides thereof, so that the elastic piece is vibrated and driven in the ±x-axis directions. The coupled forces cause the elastic piece 10b to be driven unfailingly in the ±x-axis directions, which leads to reduced energy losses.

The center elastic piece 10c, illustrated at the left side of FIG. 8A, includes electrode layers similar to the elastic piece 10b. More specifically, in the elastic piece 10b, a pair of electrode layers 21a and 22a are formed on the piezoelectric material layer B at the top of FIG. 8A, while electrode layers 21b and 22b are formed on the bottom piezoelectric material layer B. The electrode layers of the elastic piece 10c denoted by the same reference numerals as those of the elastic pieces 10b have drive voltages of the same polarity and same phase applied thereto. Therefore, like the elastic piece 10b, the elastic piece 10c is driven by coupled forces which cause rotation around the center axis which is an imaginary line Oy when forces f1 and f2 act in opposite directions in both the front and back sides thereof.

In the elastic piece 10a at the center of FIG. 8A, a pair of electrode layers 23a and 24a are formed separately on the top piezoelectric material layer B along the x-axis direction, while a pair of electrode layers 23b and 24b are formed separately on the bottom piezoelectric material layer B similarly along the x-axis direction. At a certain point in time voltages of different polarities are applied to the electrode layers 23a and 24a, as well as to the electrodes 23b and 24b. Therefore, coupled forces are also applied to the center elastic piece 10a which causes rotation around the imaginary line Oy extending along the plate thickness dimension (y-axis direction).

In this embodiment, the first driving/detecting structure is composed of the piezoelectric material layers B and the electrodes 21a, 21b, 22a, 22b, 23a, 23b, 24a, and 24b, which are formed on the front and back surfaces of the piezoelectric material layers B. The elastic pieces 10a, 10b, and 10c are driven by the first driving/detecting structure to vibrate in the x-z plane by coupled forces which causes rotation around the center axis Oy extending perpendicular to the plate (in the y-axis direction), with the side elastic pieces 10b and 10c having a phase or amplitude at a certain point in time opposite the phase or amplitude of the center elastic piece 10a (see FIG. 1). Rotation around the z-axis of the vibrator 10 whose elastic arms 10a, 10b and 10c being driven in the primary resonance vibration mode (H mode) along the plate surface (x-axis direction) produces Coriolis force which develops a force in the elastic pieces 10a, 10b and 10c along the y-axis direction, whereby each elastic piece vibrates along the y-axis direction as shown in FIG. 1. This vibration is detected by the second driving/detecting structure.

For this purpose, the elastic piece 10b has a pair of electrode layers 25 and 26, each of which are respectively formed a distance apart along the plate thickness dimension on their respective piezoelectric material layers B. If, at a certain point in time, a positive (+) drive voltage is applied to the electrode layer 25 and a negative (−) voltage is applied to the electrode layer 26, the elastic piece 10b is bent along the y-axis direction. More specifically, as shown in FIG. 3B, when, at a certain point in time, a positive voltage is applied to the electrode 25, an elongation force, fa, acts on the piezoelectric material layer B at the bottom of the figure, whereas when a negative voltage is applied to the electrode 26, a compression force, fb, acts on the piezoelectric material layer B at the top of the figure. These forces fa and fb, which act in opposite directions along the z-axis directions, are applied as coupled forces which cause rotation around an imaginary axis Ox extending in the x-axis direction and located within the elastic piece 10b.

However, due to the electrode layers 21a, 21b, 22a, and 22b, when the elastic piece 10b is driven along the x-axis direction, the electrode layers 25 and 26 are used to detect deformation of the elastic piece 10b caused when Coriolis force causes vibration along the y-axis direction. When the Coriolis force causes vibration and deformation of the elastic piece 10b at a certain point in time in the +y direction, an elongation force acts on the bottom piezoelectric material layer B, while a compression force acts on the top piezoelectric material layer B. Thus, due to the piezoelectric effect, a positive voltage is detected across the electrode layer 25, while a negative voltage is detected across the electrode layer 26. When the elastic piece 10b is deformed along the −y direction, voltages of opposite polarities are detected across the electrode layers 25 and 26, respectively.

For example, when the polarity of the voltage detected by the electrode 26 is reversed and this voltage is added to the voltage detected by the electrode layer 25, it is possible to detect the deformation of the elastic piece 10b along the y-axis direction which is caused by the Coriolis force.

When deformation of the elastic piece caused by the Coriolis force is detected by a construction including electrode layers 25 and 26 capable of developing coupled forces which cause rotation along the plate thickness dimension (y-axis direction), the elongation and compression of the elastic piece are detected by the pair of electrodes. Taking the difference between the detected voltages of the electrodes 25 and 26 increases the detected voltage, which permits angular velocity detection with higher precision.

As shown in FIG. 1, due to the Coriolis force, the elastic piece 10c is vibrated with the same phase and deformed in the same amount as the elastic piece 10b. Therefore, the elastic piece 10c has electrode layers 25 and 26 structured in the same way as those of the elastic piece 10b. In detecting the Coriolis force, the electrode layers 25 and 26 can be used to detect elongation and compression of the elastic piece, thus increasing the detection output to make possible angular velocity detection with higher precision.

The center elastic piece 10a is deformed along the y-axis direction with a phase opposite to the phases of the elastic pieces 10b and 10c on both sides of the center elastic piece, and has electrode layers 27 and 28 formed on both the front and back sides thereof. Through these electrode layers 27 and 28, coupled forces can be applied to the elastic piece 10a which causes rotation around the imaginary line Ox. In addition, the electrode layers 27 and 28 can be used to detect deformation in both directions, namely, compression and elongation, caused by the Coriolis force.

The second driving/detecting structure so constructed as having electrode layers 25, 26, 27, and 28, formed on the piezoelectric material layers B, and is capable of detecting the compression and elongation of the elastic pieces along the y-axis direction as voltages produced due to the piezoelectric effect by means of separate electrodes. Addition of the differences between of both detected voltages permits deformation caused by the Coriolis force to be output as a high voltage value.

When the elastic pieces 10a, 10b, and 10c are vibrated and driven while being deformed along the y-axis direction, and the vibrator 10 is rotated to allow detection of the deformation of the elastic pieces 10a, 10b, and 10c along the x-axis direction caused by the Coriolis force, application of driving voltage to the aforementioned electrode layers 25, 26, 27, and 28 develops coupled forces fa and fb shown in FIG. 3B, and the coupled forces effectively drive the elastic pieces along the y-axis direction. Deformation along the x-axis direction caused by the Coriolis force is detected as voltage through the electrode layers 21a, 21b, 22a, 22b, 23a, 23b, 24a, and 24b. For example, when the elastic piece 10b is deformed along the x-axis direction by the Coriolis force, the pair of electrode layers 21a and 22a detects the elongation and compression by different electrode layers, so that a high detection output can be obtained.

In FIG. 8A, the direction of polarization of the whole piezoelectric material layer B laminated on the front surface of the elastic member A is the same. This applies also to the whole piezoelectric material layer B laminated on the back side of the elastic member 1. As shown in FIG. 8B, however, it is possible to change the direction of polarity of portions of the piezoelectric material B opposing electrode layers. Although only elastic piece 10b is illustrated in FIG. 8B, the elastic pieces 10c and 10a may also be produced with different polarization directions at the portions opposing the electrode layers.

In the example of FIG. 8B, when the elastic piece 10b is deformed at a certain point in time in the +x direction, voltages of the phase are applied to the electrode layers 21a, 21b, 22a, and 22b. In this case, the elastic piece 10b is also driven by coupled forces in the +x direction. When the elastic piece 10b is deformed, for example, in the +y direction, elongation and compression is detected as a voltage change by the electrode layers 25 and 26, with voltages of the same phase (same polarity) obtained across the electrodes 25 and 26.

Figure 9:
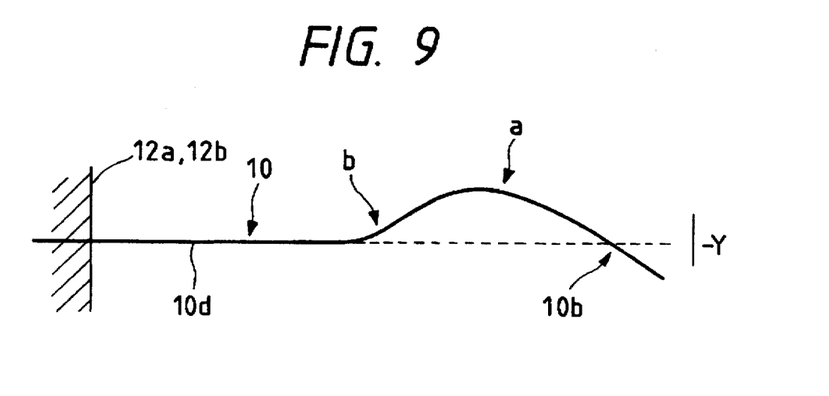
FIG. 9 illustrates deformation of an elastic piece in a secondary resonance mode.

FIG. 9 is illustrative of the elastic pieces in a vibrating state along the y-axis direction in secondary resonance mode.

For example, at a certain point in time, the elastic piece 10b deforms in the −y direction in the secondary resonance mode, and the laminated piezoelectric material layer B at the top side of the figure is elongated and pulled at portion (a). On the other hand, compressive strain occurs at the boundary (b) between the elastic piece 10b and the base section 10d. The opposite occurs in the bottom piezoelectric material layer B—that is, compressive strain occurs in the (a) portion, while tensile strain occurs in the (b) portion.

It is assumed that the same electrode layers 25 and 26 and piezoelectric material layers form the second driving/detecting structure along the entire length La of the elastic piece 10b, which extends in the z-axis direction. When the elastic piece 10b is in a deformed state as shown in FIG. 9, although a voltage based on the tensile strain of the piezoelectric material layer B is supposed to be detected across the top electrode layer 26, a compressive strain occurs in a portion of the piezoelectric material layer B at the (b) portion, so that the potential at the (b) portion developed by the piezoelectric effect is opposite in polarity to the potential of the (a) portion. In other words, the detected voltage developed across the (b) portion due to the piezoelectric effect cancels the detected voltage at the (a) portion developed by tensile strain due to the piezoelectric effect. Therefore, in detecting the deformation of the elastic piece along the y-axis direction caused by the Coriolis effect, the detected voltage output is reduced, thereby reducing the detection precision.

Figure 10A:
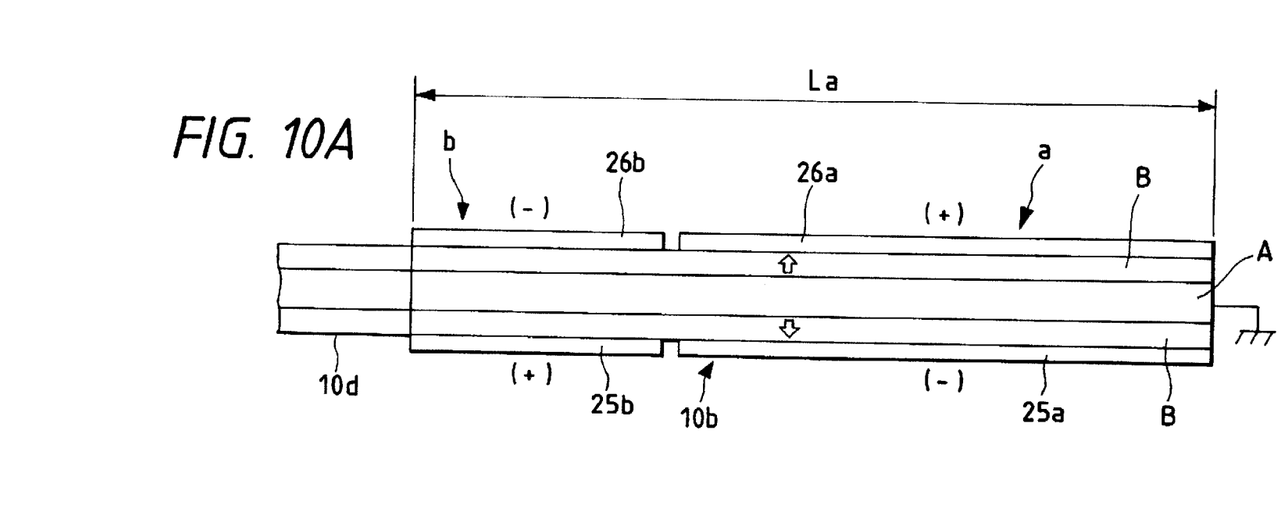
FIGS. 10A and 10B are side views of a construction of a detecting section for detecting the deformation shown in FIG. 9.
Figure 10B:
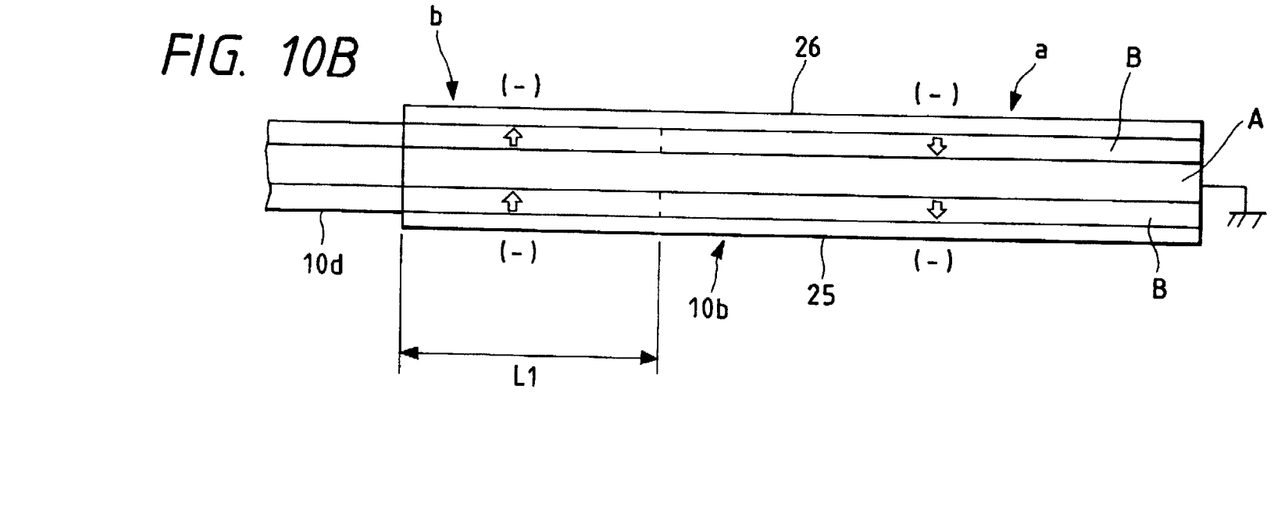

To avoid such a problem, according to the embodiment of FIGS. 10A and 10B, it is possible to separately detect deformations of the elastic piece 10b at the (a) portion (elongated portion) and the (b) portion (compressed portion).

FIG. 10A illustrates the case when the piezoelectric material layers laminated on both the front and back sides of elastic member 10b each have the same polarity direction throughout. In this case, the electrodes 25 and 26 of the elastic member 10b comprising the second driving/detecting structure are provided at the (a) portion and the (b) portion as separate portions. In FIG. 10A, electrode layers 25a and 26a are formed at the (a) portion, while short electrodes 25b and 26b are formed at the (b) portion.

Referring to FIG. 10A, when the elastic piece 10b vibrates in secondary resonance mode and becomes deformed at a certain point in time, as illustrated in FIG. 9, tensile strain occurs at the (a) portion of the top piezoelectric material layer B and this strain is detected as positive (+) voltage across the electrode layer 26a, while compressive strain occurring at the (b) portion is detected as negative (−) voltage across the electrode layer 26b. On the other hand, at the bottom piezoelectric material layer, negative (−) voltage is detected across the electrode layer 25a, while positive (+) voltage is detected across the electrode layer 25b. For example, when the polarities of the detected voltages of the electrode layers 25a and 26b are reversed and these detected voltages are added to the detected voltages of the electrode layers 26a and 25b, this sum is detected, without the tensile strain at the (a) portion and the compressive strain at the (b) portion canceling each other out.

FIG. 10B illustrates the case when the polarization directions of the portions of the piezoelectric material layer opposing the electrode layers are different, as shown in FIG. 8B.

In FIG. 10B, the polarization directions of the (a) and (b) portions of the piezoelectric material layers B at the front side as well as the portions at the back side are opposite each other. In this case, the electrode layer 25 is formed on the entire back side of the piezoelectric material layer B, while the electrode layer 26 is formed on the entire front side of the piezoelectric material layer B along the z-axis direction. In FIG. 10B, when the elastic piece 10b is deformed as shown in FIG. 9, the directions of polarization of the (a) and the (b) portions of the piezoelectric material layer B are different, so that, at the (a) portion of the electrode layer 26 tensile strain of the piezoelectric material layer causes a negative (−) voltage to be developed, while at the (b) portion of the electrode layer 26, a compressive strain causes a negative (−) voltage to be developed. The same applies to the bottom piezoelectric material layer. Compressive strain occurring at the (a) portion of the electrode layer 25 causes a negative (−) voltage to be developed, while tensile strain occurring at the (b) portion of the electrode layer 25 causes a negative (−) voltage to be developed. In FIG. 10B, although the elongated portion and the compressed portion are separately detected, the voltage outputs are of the same polarity, so that addition of the detected voltages of the electrode layers 25 and 26 results in a more precise detection of the deformation of the elastic piece 10b caused by vibration in the secondary resonance mode, without the tensile strain and the compressive strain canceling each other out.

However, when the lengths L1 of the electrode layers 25b and 26b, illustrated in FIG. 10A or the lengths L1 of the portions having different directions of polarization of FIG. 10B are made too long, elongation and compression detected as voltages cancel each other out within the L1 range.

Figure 11:
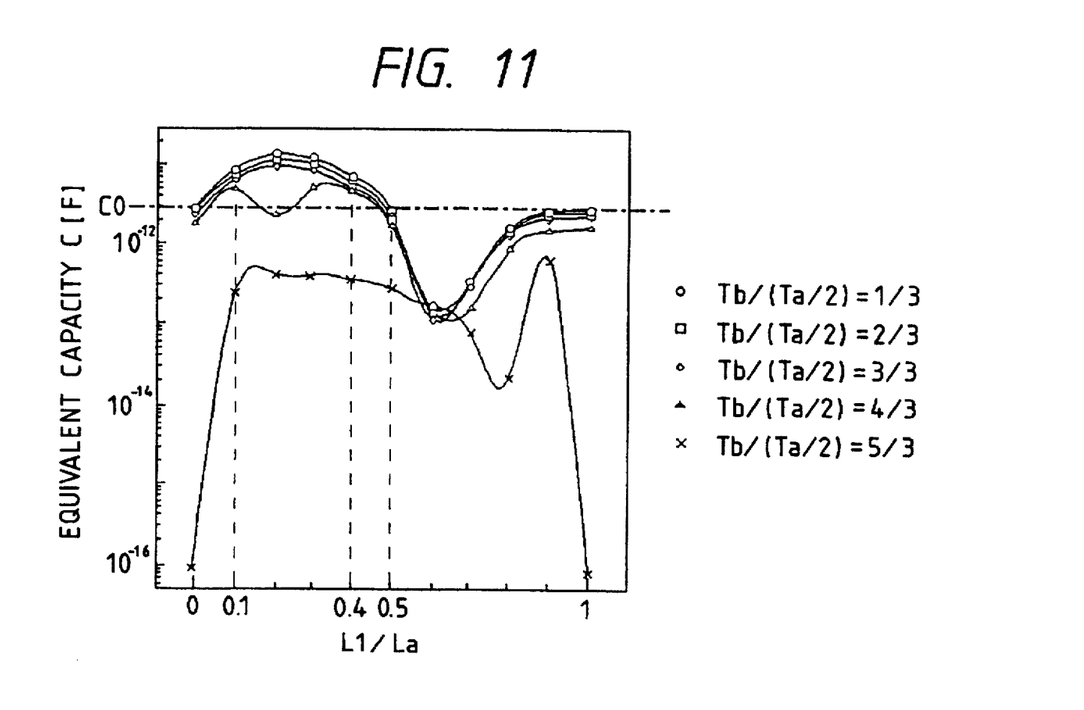
FIG. 11 is a diagram showing the relationship between the length of the portion L1 of FIG. 10 and equivalent capacity.

FIG. 11 illustrates the effects the ratio of the aforementioned length L1 and the elastic piece length La has on the detection precision.

FIG. 11 shows the equivalent capacity C of an elastic piece of the vibrator 10 with changes in L1/La. The larger the equivalent capacity C, the more precise is the angular velocity detection. FIG. 11 also shows the equivalent capacity with different piezoelectric material layer B thickness (Tb)/elastic member A thickness (Ta) ratios. The o indicates a Tb/(Ta/2) value of 1/3, the □ a Tb/(Ta/2) value of 2/3, the ◊ a Tb/(Ta/2) value of 3/3, the △ a Tb/(Ta/2) value of 4/3, and the x a Tb/(Ta/2) value of 5/3. In FIG. 11, the horizontal axis indicates L1/La, while the vertical axis indicates the equivalent capacity c. Since measurements are conducted on a layer of elastic member A and a layer of piezoelectric material layer B, Ta value is halved in FIG. 11.

As can be seen from FIG. 11, for Tb/(Ta/2) values indicated by △ and x having a piezoelectric material layer B thickness Tb which is thicker than the elastic member A thickness Ta, the equivalent capacity is unstable. This means that when the piezoelectric material layer B thickness becomes too large, the elastic member mass with respect to Young's modulus of the elastic member becomes too large, so that a stable resonance vibration can no longer be achieved. Therefore, for the vibrator 10 having an elastic member laminated with piezoelectric material layers on its front and back sides, it is preferable that the piezoelectric material layer thickness Tb of a layer is equal to or less than one-half the elastic member A thickness Ta.

In FIG. 11, the equivalent capacity of when L1=0 and when L1/La=1 are indicated as C0. More specifically, the equivalent capacity of an elastic member composed of piezoelectric material layer and electrode layers having a length equal to the overall length La of the elastic piece (that is, an elastic member not having an L1 portion in FIG. 10) is expressed as C0.

When the overall equivalent capacity becomes greater than the aforementioned C0, the L1 portion of FIG. 10 allows more precise detection of the vibration deformation. FIG. 11 shows that L1/La is preferably less than 0.5, more preferably less than 0.4, or greater than 0.1 and less than 0.4.

As shown in FIGS. 10A and 10B, the elongated and compressed portions of the piezoelectric material layers are also detected separately for the other elastic members 10c and 10a.

Although, in FIGS. 9 and 10, deformation of the elastic member when it is vibrating in the secondary resonance mode was illustrated, deformation of the elastic member when it is vibrating in a tertiary or higher degree resonance mode can also be detected with high precision, without the tensile strain and compressive strain canceling each other out. This is done by separately detecting the compressed and elongated portions of the piezoelectric material layers, as illustrated in FIG. 10.

FIG. 12 illustrates the overall construction of an elastic member having formed on the front and back sides of the elastic member A piezoelectric material layers B in which electrode patterns, shown in FIGS. 8 and 9, are formed on the front and back surfaces of the piezoelectric material layers B. Reference numerals given to the electrode layers of FIG. 12 correspond to those given to the electrode layers of FIGS. 8 and 9.

Figure 12A:
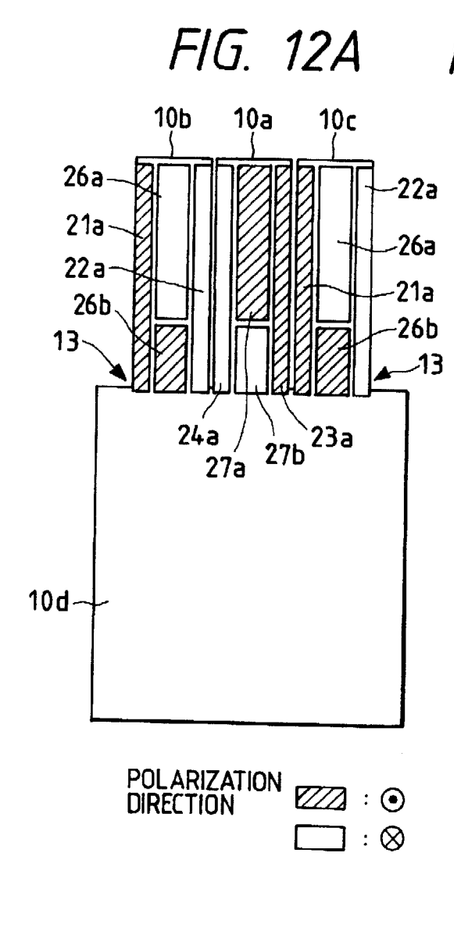
FIGS. 12A, 12B, and 12C are respectively a plan view, a side view, and a bottom view of the vibrator, illustrating specific examples of the electrode layers formed in the vibrator.
Figures 12B, 12C:
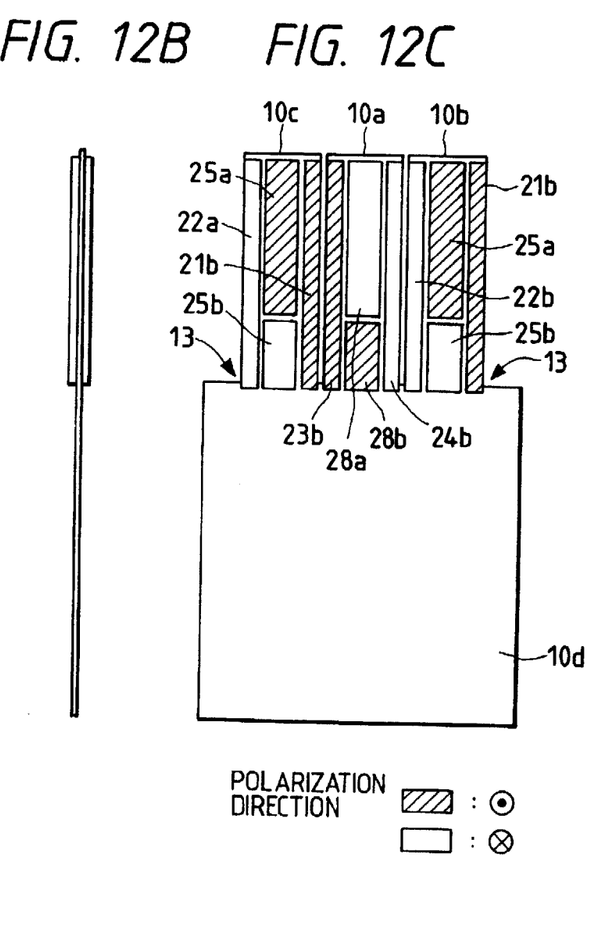

FIG. 12A is a plan view as viewed from the top of the vibrator 10 of FIGS. 8 and 10, FIG. 12B is a side view of the vibrator 10, and FIG. 12C is a bottom view as viewed from the bottom of the vibrator 10 of FIGS. 8 and 10.

When the piezoelectric material layers B formed on the front and back sides of the elastic member A have the same direction of polarization throughout the vibrator, more specifically, when the vibrator has a construction as illustrated in FIGS. 8A and 10A, those electrodes in FIGS. 12A and 12C which are indicated as hatched electrodes have a drive voltage or detection voltage which is positive at a certain point in time, while those electrodes indicated as unhatched electrodes have a drive or detection voltage which is negative at a certain point in time.

As shown in FIGS. 8B and 10B, when the piezoelectric layer portions opposing the electrode layers have different directions of polarization, the directions of polarization of the piezoelectric material layer formed below the electrode layers which are hatched in FIG. 12A are toward the paper surface, while the directions of polarization of the piezoelectric material layer which are not hatched are away from the paper surface. Even in the bottom view of FIG. 12C, the directions of polarization of the hatched electrode layer portions are toward the paper surface, while the directions of polarization of the unhatched electrode layer portions are away from the paper surface.

As can be understood from the foregoing description, since the vibratory gyroscope of the present invention has a plate-shaped vibrator, it can be easily manufactured in large quantities at a low cost. In addition, a supporting construction using rigid bodies permits the supporting condition to be stabilized. Further, adjustment of the resonance frequency can be achieved by only trimming the center elastic piece, so that frequency setting can be performed easily.

Since the side ends or the outer sides of the side elastic pieces and the side ends of the base section of the vibrator are formed such that there is a level difference, twisting stress acts less often on the base section, which makes possible stable resonance vibration.

A construction including electrodes capable of driving the elastic pieces by couple of forces in both the H mode and the V mode permits very efficient driving of the elastic pieces in the H mode or V mode and deformation due to the Coriolis force can be detected with high precision.

When the elastic pieces vibrate along the plate thickness (y-axis) direction in a secondary or higher degree resonance mode, the compressed portion and the elongated portion are detected separately and are added together, so as to allow deformation of the elastic pieces along the y-axis direction to be detected with high precision.

When the vibrator is a laminated structure of piezoelectric material layers on both the front and back sides of the elastic member, it is possible to apply a large straining force developed by the piezoelectric effect to the elastic members and to detect the deformation of the elastic members with high precision. Formation of the vibrator by punching out the laminated structure makes it unnecessary to position and bond the individual piezoelectric material layers, so that the vibrator can be manufactured more readily with higher precision.

We claim:

1. A vibratory gyroscope, comprising:

a plate-shaped vibrator defining an x-z plane, the vibrator including a base portion and parallel first, second and third elastic arms extending from the base portion in a z-axis direction, the first and second elastic arms being separated by a first slit, and the first and third elastic arms being separated by a second slit such that the first elastic arm is located between the second and third elastic arms;

driving means for generating vibration in at least one of said first, second and third elastic arms in a first direction; and detecting means for detecting a vibration component in at least one of said first, second and third elastic arms in a second direction when the vibrator rotates around the z-axis direction, the second direction being perpendicular to the first direction;

wherein a maximum width of the base section is greater than a distance between an outside edge of the second elastic arm and an outside edge of the third elastic arm, both the maximum width and the distance being measured in an x-axis direction;

wherein the base section of the vibrator includes first and second outer edges, and wherein both the outside edge of the second elastic arm and the outside edge of the third elastic arm define parallel lines extending in the z-axis direction which are located between the first and second outer edges of the base section; and wherein each of the first, second and third elastic arms includes a common width in the x-axis direction, and wherein a distance in the x-axis direction separating the outside edge of the second elastic arm and the first outer edge of the base section is less than 0.8 times the common width of each of the first, second and third elastic arms.

2. A vibratory gyroscope according to claim 1, wherein the first, second and third elastic arms are driven in a deformation vibration mode in which the second and third elastic arms are driven in a first phase, while the first elastic arm is driven in a second phase, the first and second phases differing by 180°.

3. A vibratory gyroscope comprising:

a plate-shaped vibrator defining an x-z plane, the vibrator including a base portion and parallel first, second and third elastic arms extending from the base portion in a z-axis direction, the first and second elastic arms being separated by a first slit, and the first and third elastic arms being separated by a second slit such that the first elastic arm is located between the second and third elastic arms;

a driving means for generating vibration in at least one of said first, second and third elastic arms in a first direction; and a detecting means for detecting a vibration component in at least one of said first, second and third elastic arms in a second direction when the vibrator rotates around a z-axis direction, the second direction being perpendicular to the first direction;

wherein said detecting means separately detects the compressed and elongated portions on a surface of said at least one of said first, second and third elastic when said at least one of said first, second and third elastic arms vibrates in a y-axis direction in a secondary or higher degree resonance mode.

4. A vibratory gyroscope according to claim 3, wherein said detecting means comprises:

a piezoelectric material layer having a first polarization direction at the compressed portion and a second polarization at the elongated portion on the surface of said at least one of said first, second and third elastic, and electrode layers formed on the piezoelectric material layer.

5. A vibratory gyroscope according to claim 4, wherein said first, second and third elastic arms are driven in a deformation vibration mode in which the second and third elastic arms are driven in a first phase, while the first elastic arm is driven in a second phase, the first and second phases differing by 180°.

6. A vibratory gyroscope according to claim 4, wherein said first, second and third elastic arms vibrate along the y-axis direction in the secondary resonance mode, and a length of the piezoelectric material layer having a first polarization direction extending from the base section being less than 0.5 times an overall length of the elastic arms.

7. A vibratory gyroscope according to claim 3, wherein said detecting means comprises:

a piezoelectric material layer formed over said first, second and third elastic arms, a first electrode layer formed on the piezoelectric material layer over the compressed portion of said at least one of said first, second and third elastic, and a second electrode layer formed on the piezoelectric material layer over the elongated portion of said at least one of said first, second and third elastic.

8. A vibratory gyroscope according to claim 7, wherein said first, second and third elastic arms are driven in a deformation vibration mode in which the second and third elastic arms are driven in a first phase, while the first elastic arm is driven in a second phase, the first and second phases differing by 180°.

9. A vibratory gyroscope according to claim 7, wherein said first, second and third elastic arms vibrate along the y-axis direction in the secondary resonance mode, and a length of the piezoelectric material layer having a first polarization direction extending from the base section being less than 0.5 times an overall length of the elastic arms.

* * * * *